United States Patent
Hoffleit et al.

(10) Patent No.: US 12,242,402 B2
(45) Date of Patent: Mar. 4, 2025

(54) COMMUNICATION CONTROLLER AND COMMUNICATION CONTROL METHOD

(71) Applicant: Renesas Electronics Corporation, Tokyo (JP)

(72) Inventors: Thorsten Hoffleit, Dusseldorf (DE); Christian Mardmöller, Dusseldorf (DE)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 17/958,685

(22) Filed: Oct. 3, 2022

(65) Prior Publication Data

US 2023/0110907 A1  Apr. 13, 2023

(30) Foreign Application Priority Data

Oct. 7, 2021 (EP) .................................... 21201479

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
None
See application file for complete search history.

(56) References Cited

U.S. PATENT DOCUMENTS

| | | | | |
|---|---|---|---|---|
| 5,754,436 A | * | 5/1998 | Walsh | G06F 9/30083 700/286 |
| 7,721,068 B2 | * | 5/2010 | Lowe | G06F 12/1081 710/36 |
| 10,162,793 B1 | * | 12/2018 | Bshara | H04L 69/16 |
| 10,673,439 B1 | * | 6/2020 | Ahmad | H03K 19/17736 |
| 11,063,594 B1 | * | 7/2021 | Ahmad | H03K 19/1776 |
| 11,630,698 B2 | * | 4/2023 | Levin | G06F 9/5011 718/101 |
| 12,003,853 B2 | * | 6/2024 | Rivard | H04N 23/611 |
| 2008/0005495 A1 | * | 1/2008 | Lowe | G06F 12/1081 711/E12.067 |
| 2009/0276605 A1 | * | 11/2009 | Arndt | G06F 12/0646 711/E12.016 |
| 2009/0282139 A1 | * | 11/2009 | Mejdrich | G06F 9/45533 717/138 |
| 2014/0355613 A1 | * | 12/2014 | Pope | H04L 49/20 370/392 |
| 2018/0213669 A1 | * | 7/2018 | Kochukunju | G06F 9/45558 |
| 2019/0385057 A1 | * | 12/2019 | Litichever | H04L 63/14 |
| 2021/0124711 A1 | * | 4/2021 | Ansari | G06F 11/0772 |

(Continued)

FOREIGN PATENT DOCUMENTS

WO  1999052253 A1  10/1999
WO  2012141696 A1  10/2012

*Primary Examiner* — Henry Tsai
*Assistant Examiner* — Christopher A Bartels
(74) *Attorney, Agent, or Firm* — SCULLY, SCOTT, MURPHY & PRESSER, P.C.

(57) ABSTRACT

A communications controller is disclosed. The communications controller includes a data transfer unit and a protocol engine. The communications controller further includes a circuit configured to control transfer of data from the data transfer unit to the protocol engine in dependence upon a process identifier which identifies a process entity requiring the protocol engine to transmit data for the process entity.

16 Claims, 7 Drawing Sheets

(56) References Cited

U.S. PATENT DOCUMENTS

2022/0046114 A1* 2/2022 Entelis .................... H04L 12/40
2022/0103186 A1* 3/2022 Kaminitz .............. H03M 13/15
2022/0164303 A1* 5/2022 Raghav ............... G06F 12/0871
2022/0206958 A1* 6/2022 LeMay ............... G06F 12/0831
2022/0391341 A1* 12/2022 Rosenbaum ...... G06F 15/17331

* cited by examiner

Look-up table 32

| Channel no. | Identifier |
|---|---|
| 0 | 0 |
| 1 | 0 |
| 2 | 0 |
| 3 | 1 |
| 4 | 2 |
| 5 | 1 |
| 6 | 0 |
| 7 | 1 |
| 8 | 1 |
| 9 | 1 |
| 10 | 3 |
| 11 | 0 |
| 12 | 0 |
| 13 | 0 |
| 14 | 0 |
| 15 | 0 |

COMMUNICATION CONTROLLER AND COMMUNICATION CONTROL METHOD

CROSS-REFERENCE TO RELATED APPLICATION

The present application claims priority to European Patent Application No. EP21201479.9, filed one Oct. 7, 2021. The entire disclosure of European Patent Application No. EP21201479.9 is incorporated by reference into the present application by this reference.

BACKGROUND

Field

The present disclosure relates to a communication controller, an integrated circuit including the communication controller, a vehicle including the integrated circuit, and a communication control method.

Description of Related Art

A communication controller, such as a control area network (CAN) controller or an Ethernet controller, can usually handle transmissions for different initiators (which can be, for example, CPU cores, operating systems or processes) by providing independent transmit resources. A transmit resource is a hardware element that holds data for transmission either directly, as a transmit object, or indirectly, as pointer to a transmit object in memory.

Typically, transmit resources are protected at a system level, for example, using CPU memory management units (MMUs), input/output memory management units (IOMMUs) access control or content guards.

A CPU MMU provides protection for access made by the CPU to memory or special functional registers (SFRs). The operating system configures an MMU table according to the process currently running.

An IOMMU is provided in front of a direct memory access (DMA) controller. This form of memory management unit protects memory accesses executed by the DMA controller. Since a DMA controller can act on behalf of different processes, the DMA controller informs the IOMMU which process it is currently working on behalf of using an identifier. The IOMMU has a set of tables (typically between 1 and 8 tables) for all processes and the identifier selects the active table. An example of an IOMMU is IPMMU, which is an implementation of IOMMU that is compatible with ARM VMSA page tables. For example, if there are first and second processes and first and second transmit resources, the first process having physical access to the first transmit resource, the second process having physical access to the second transmit resource, protection may be achieved by the second process having no physical access to the first transmit resource, achieved by IOMMU access protection or guards. Thus, there is no interference between first and second processes on the first transmit resource.

There are, however, cases where it may not be possible or desirable to have a fixed assignment of one resource to one process. For example, a particular resource may have a large silicon footprint and so is expensive to duplicate. In another example, a resource may need to be provided as a single instance, such as a first-in, first-out (FIFO) buffer or a traffic shaper, when the order for transmission needs to be kept. Finally, processes may interfere with each other.

Existing commonly-used memory management systems usually allow assignment of a memory region to one or more specific processes. While this protects the memory region, it does not protect how the assigned process uses the resource. Moreover, it does not protect a shared resource from out-of-scope use by an assigned process.

Data rate limiters (such as credit-based shapers) and filters can be used for transmit resources, such as egress queues, on a transmit path to a network. However, if more than one DMA controller channel can add data to the same queue, then such a queue-based limiters would only protect the network, rather than transmit resources.

SUMMARY

According to a first aspect of the present disclosure there is provided a communications controller comprising a data transfer unit and a protocol engine. The communications controller further comprises a circuit configured to control transfer of the data from the data transfer unit to the protocol engine in dependence upon a process identifier which identifies a process entity requiring the protocol engine to transmit data for the process entity. The circuit preferably controls transfer of the data according to the process identifier based on bandwidth, transmission management data and/or payload content.

Thus, the circuit can help avoid a process entity from blocking transmit elements and sending improper data.

The process identifier may be an operating system identifier (OS-ID) or ContextID.

The circuit may comprise an acceptance filter. The circuit may comprise a commit count limiter. The circuit may comprise a data rate limiter.

The data transfer unit may be a direct memory access (DMA) controller which comprises a plurality of independent channels and may be configured such that access to the channels is based on (or "uses" or "depends on") process identifiers including the process identifier.

The data transfer unit may comprise a buffer (or "data transfer buffer") for storing data and the buffer can be used instead of a DMA controller. A CPU or a DMA controller outside of the communications controller may store data in the buffer, and the protocol engine may retrieve data from the buffer.

The protocol engine may be a controller area network (CAN) protocol engine. The protocol engine may conform to CAN 2.0 specification, to CAN flexible data-rate, CAN-FD, specification or the CAN-XL specification.

The protocol engine may be an Ethernet protocol engine.

The circuit may be arranged to control flow of data based on credit, past number or rate of requests or available resources.

The circuit may include a filter for inspecting content of the data (such as management data and/or payload data) to determine that the content of the data is valid (or "proper"). The filter may be configured, upon determining that the data is valid, to allow the data to pass towards the protocol engine. The filter may be configured, upon determining that the data is invalid, to block and/or discard the data.

The circuit may include a first limiter for determining whether the process entity is committing data to one or more transmit elements at a commit rate (i.e., a rate at which it commits a transmit element) which exceeds a threshold commit rate. In one commit, one or more frames may be sent to the transmit element. The first limiter may be configured, upon determining that the commit rate exceeds a threshold commit rate of time, to block and/or discard the data, or to limit commit rate.

The circuit may include a second limiter for determining whether the process entity is committing data at a bandwidth (i.e., data rate) which exceeds a threshold bandwidth. The second limiter may be configured, upon determining that the bandwidth exceeds a threshold bandwidth, to block and/or discard the data, or to limit bandwidth at which the data passes towards the protocol engine.

The circuit may be operable, in response to determining data transfer to the protocol engine is to be limited, to signal an instruction ("a first instruction") to discard data to the data transfer unit and/or an instruction ("a second instruction") to discard data downstream, for example, to a transmit element or a temporary buffer between the circuit and the transmit element.

The circuit may be operable to signal back-pressure to the data transfer unit.

The communications controller may further comprise at least one transmit element for storing data between the circuit and the protocol engine. The at least one transmit element may be interposed in a data transmission path between the circuit and the protocol engine. The communications controller may further comprise a buffer between the circuit and the at least one transmit element.

According to a second aspect of the present disclosure, there is provided an integrated circuit comprising a processor and the communications controller of the first aspect. The processor is operable to run a process (which is a process entity) requiring the communication controller to transmit data.

The integrated circuit may further comprise an on-chip interconnect for allowing the processor to access memory and/or the communications controller and memory protection circuitry for controlling access to the on-chip interconnect connect. The memory protection circuitry may take the form of a memory management unit, for example, a CPU MMU, and/or IOMMU, such as an IPMMU.

The integrated circuit may further comprise memory for storing data for transmission.

The integrated circuit may be a microcontroller or system-on-a chip.

According to a third aspect of the present disclosure, there is provided a motor vehicle comprising a bus and at least two nodes arranged to communicate via the bus, at least one of the at least two nodes comprising the integrated circuit of the second aspect.

The motor vehicle may be a motorcycle, an automobile (sometimes referred to as a "car"), a minibus, a bus, a truck or lorry. The motor vehicle may be powered by an internal combustion engine and/or one or more electric motors.

According to a fourth aspect of the present disclosure, there is provided a hardware-implemented method, comprising controlling transfer of data from a data transfer unit to a protocol engine in dependence upon a process identifier which identifies a process entity requiring the protocol engine to transmit data for the process entity. The transfer of the data is controlled according to the process identifier and is preferably based on bandwidth, transmission management data and/or payload content.

BRIEF DESCRIPTION OF THE DRAWINGS

Certain embodiments of the present disclosure will now be described, by way of example, with reference to the accompanying drawings, in which.

DETAILED DESCRIPTION

Figure 1:
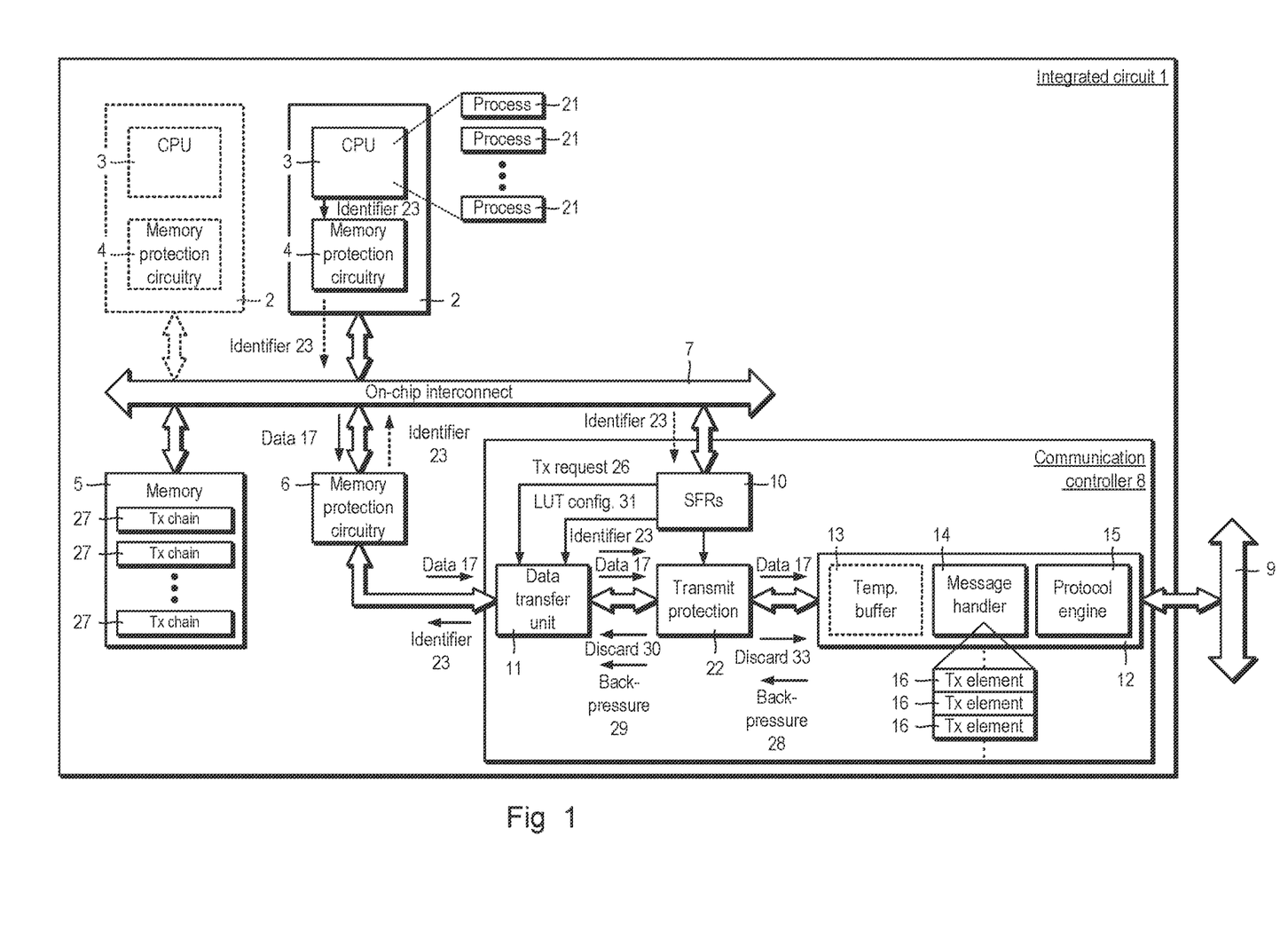
FIG. 1 is a schematic block diagram of an integrated circuit which includes a communication controller comprising a data transfer unit, transmit protection circuitry, and a protocol engine.

Referring to FIG. 1, an integrated circuit 1 in the form of microcontroller is shown. The integrated circuit 1 may take the form of a system-on-a-chip (SoC) or other form of processor-based device. In this example, the integrated circuit 1 provides Controller Area Network (CAN) controller functionality in a node 102 (FIG. 8) operable according to CAN 2.0, CAN-FD and/or CAN-XL. Other forms of communication protocols, such as Ethernet, can, however, be used.

The integrated circuit 1 includes at least one central processor unit (CPU) sub-system 2, which includes at least one CPU 3 and CPU-side memory protection circuitry 4, system memory 5, and I/O-side memory protection circuitry 6 connected via an on-chip interconnect 7, such as AXI interconnect. The CPU-side memory protection circuitry 4 may take the form of memory management units (MMUs). The I/O-side memory protection circuitry 6 may take the form of an IOMMU, such as IPMMU. The system memory 5 may be provided off chip, e.g., by separate memory integrated circuit.

The integrated circuit 1 includes a communications controller 8 for accessing a bus 9. The PHY is not shown for clarity. In this case, the communications controller 8 is a CAN controller and the bus is a CAN bus. The CPU 3 is able to access, via the CPU-side memory protection circuitry 4 and on-chip interconnect 7, system memory 5 and special functional registers 10 (SFRs) in the communication controller 8. The communication controller 8 is able to access the system memory 5 via the I/O-side memory protection circuitry 6.

Figure 5:
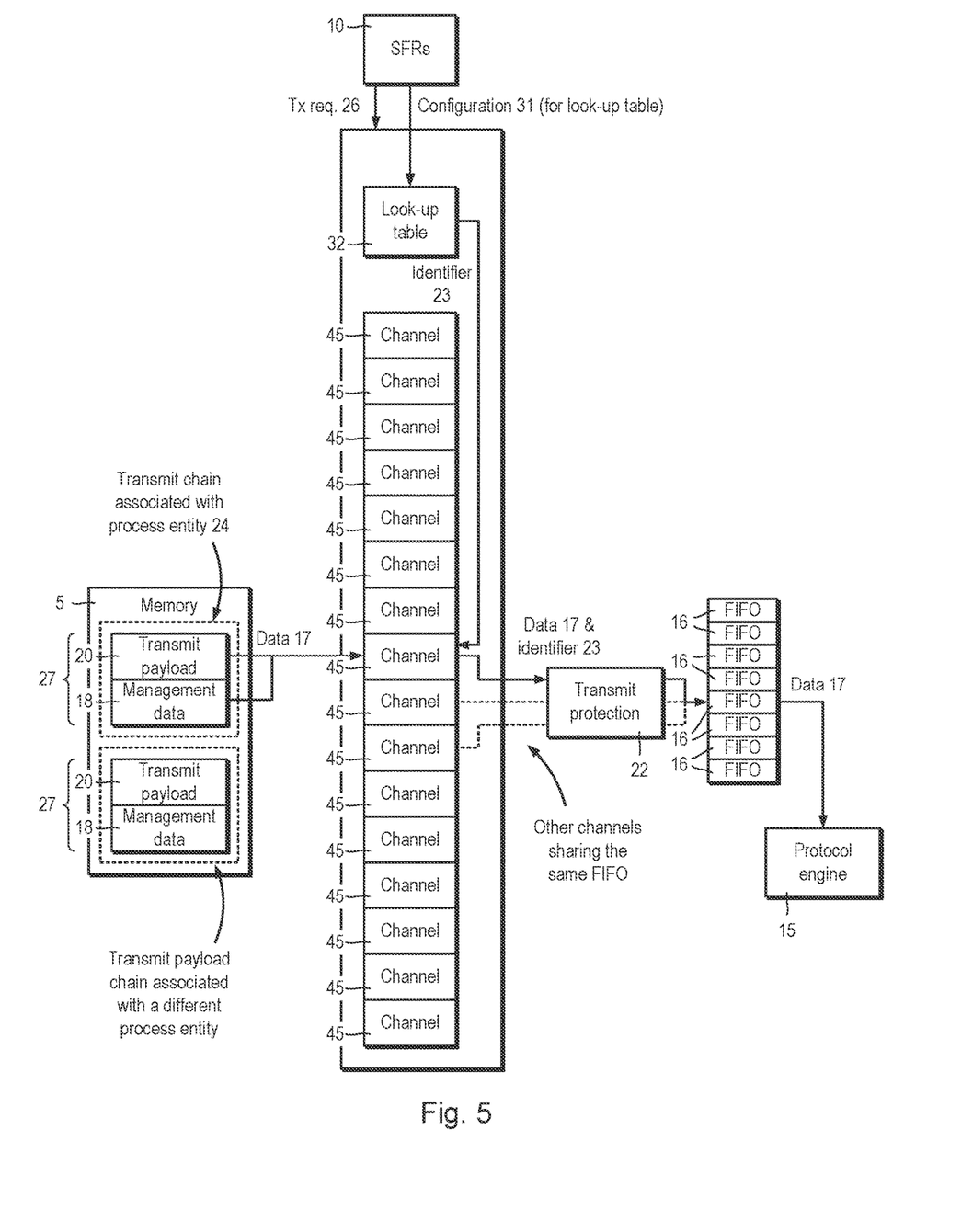
FIG. 5 is schematic block diagram of a data transfer unit having data transfers channels.

The communications controller 8 includes a data transfer unit 11 and a controller sub-system 12 which includes an optional temporary buffer 13, a message handler 14 and a protocol engine 15. In this case, the message handler 14 includes transmit elements 16 (or "transmit resources"). A transmit element 16 is a hardware element for holding data for transmission. The data transfer unit 11 is used to transfer data 17 (for example a frame at a time) to the protocol engine 15. The data 17 can include transmission management data 18, such as header data 19 (FIG. 7), and payload data 20. The data transfer unit 11 can take the form of a direct access media (DMA) controller which receives a request to transfer data 17 and transfers the data 17. The data transfer unit 11 may, however, take the form of a buffer or other form of storage which receives data 17 (for example, from a CPU, the DMA controller or another DMA controller) and stores the data 17 for retrieval by the protocol engine 15. Such a data transfer unit is referred to as a "passive data transfer unit". Thus, the CPU 3 can store a frame in the passive data transfer unit 11 (instead of system memory 5) and set a flag in the SFRs 10 for triggering transfer of the frame from the data transfer unit 11. The CPU-side memory protection circuitry 4 ensures that a process 21 running on the CPU 3 can only access an assigned DMA channel 45 (FIG. 5).

The communications controller 8 includes transmit protection circuitry 22 (herein also referred to as a "transmit protection unit", a "transmit protection circuit" or simply "circuit") between the data transfer unit 11 and the protocol engine 15. The transmit protection circuitry 22 is implemented in hardware. As will be explained in more detail hereinafter, the transmit protection circuitry 22 controls transfer of data 17 from the data transfer unit 11 to the protocol engine 15 depending on a process identifier 23, which may take the form of, for example, an operating system identifier (OS-ID) or ARM (RTM) ContextID.

The same process identifier 23 can be sent from the data transfer unit 11 to the transmit protection circuitry 22 and to the I/O-side memory protection circuitry 6. Different formats or sizes for the identifier may, however, be used. For example, the communication controller 8 may use a 4-bit identifier since transmit protection circuitry 22 may employ 16 tables. The I/O-side memory protection circuitry 6 may, however, only have four tables, and so only need two bits. Nevertheless, it is possible to use finer granularity inside the communication controller 8 by, for example, using only four levels for the operating system (which is granted the highest-level protection) and using four sub-levels in the transmit protection circuitry 22 for the processes inside operating system (which are granted lower levels of protection).

Figure 2:
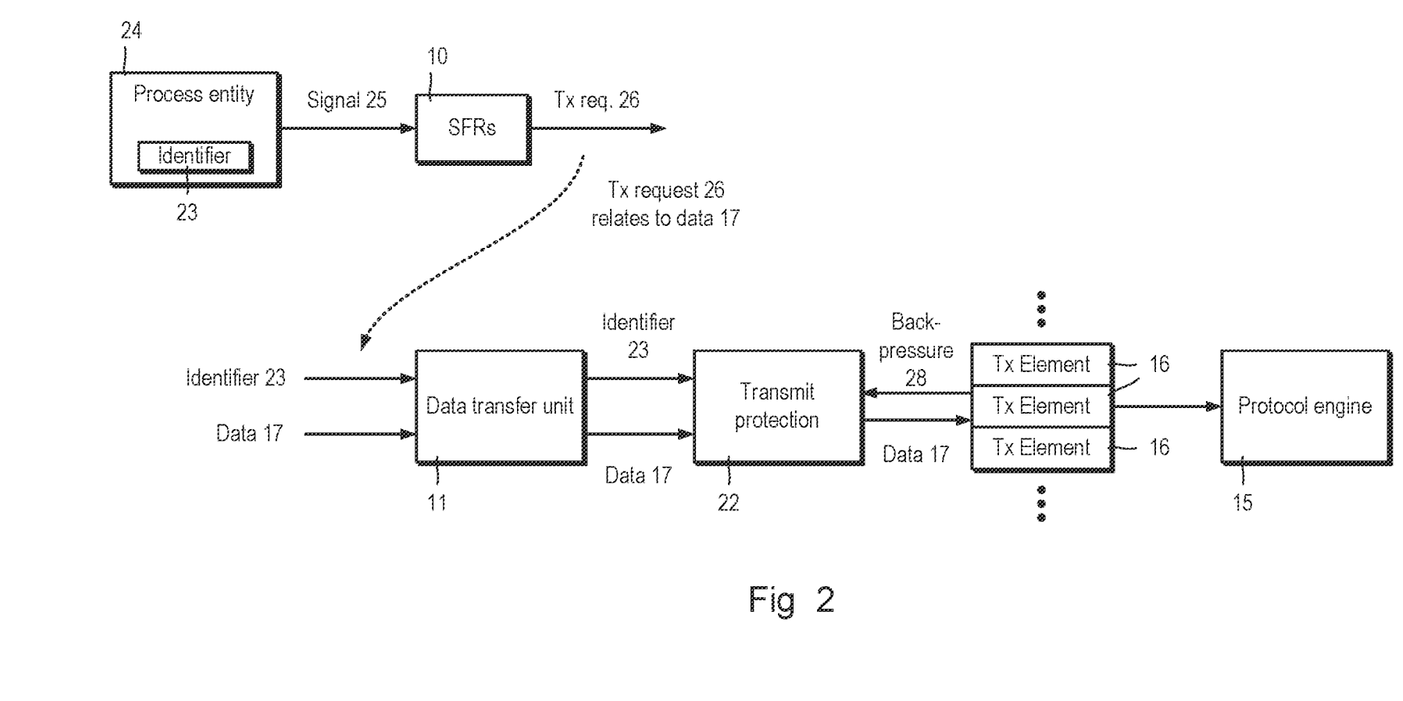
FIG. 2 is a schematic diagram illustrating a transmit protection.
Figure 7:
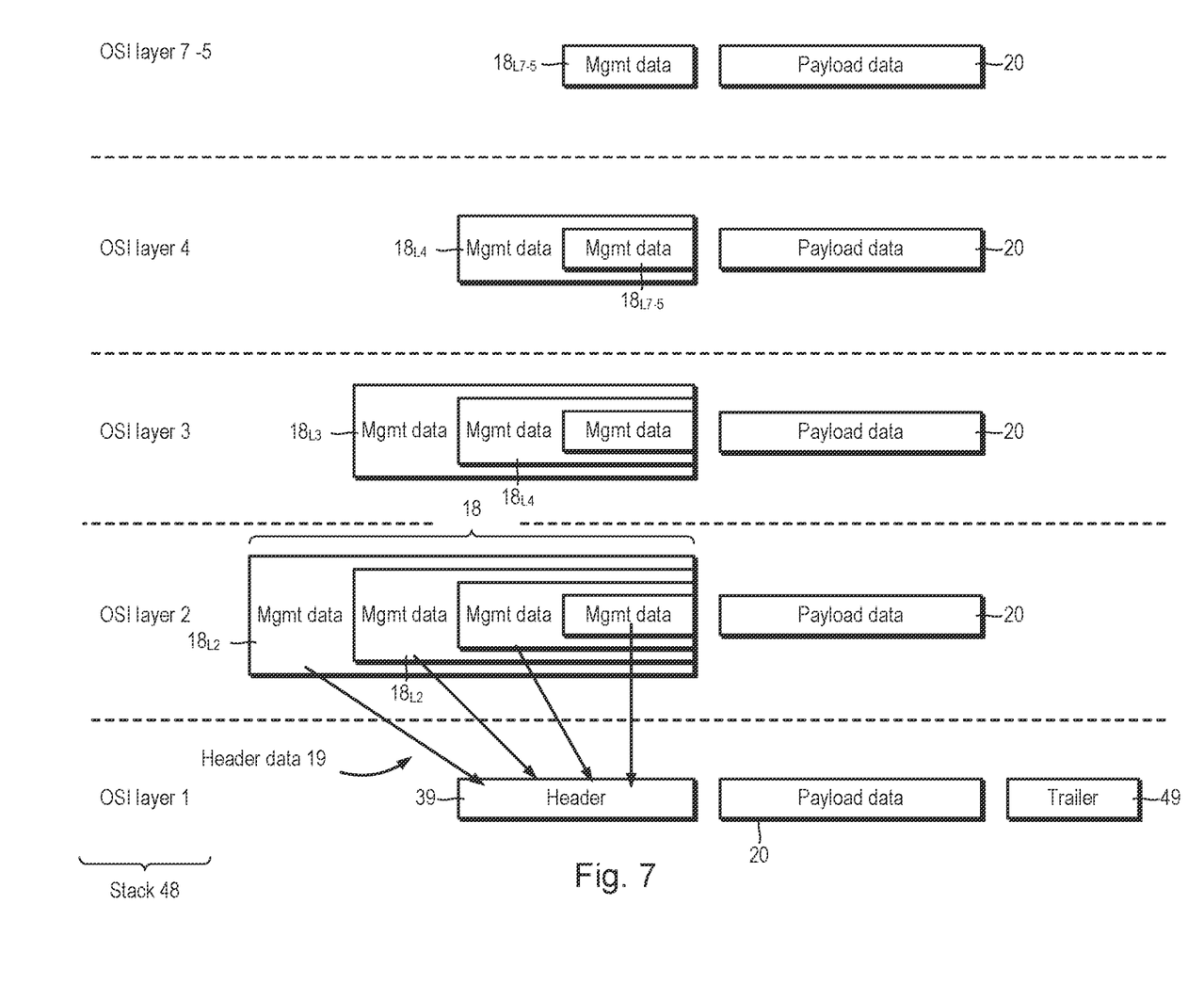
FIG. 7 is a schematic data illustrating a management data used to describe and/or transmit payload data.

Referring also to FIG. 2, the process identifier 23 identifies a process entity 24 requiring the protocol engine 15 to transmit data 17. The process entity 24 directly or indirectly causes data 17 to be transferred from system memory 5 to the protocol engine 15 via the data transfer unit 11 which can play an active part (in the case of a DMA controller) or a passive role (in the case of a buffer). For example, the process entity can send a signal 25 to set a flag in the SFRs 10 which sends a transmit request 26 to the data transfer unit 11 to trigger, for example, the data transfer unit 11 to retrieve the data 17 and pass it towards the protocol engine 15. The transmit protection circuitry 22 uses the process identifier 23 to control transfer of the data 17 based on payload content, bandwidth, and/or transmission management data 18. The transmission management data 18 is data which is used for (or in connection with) transmitting the payload data 20. For example, the transmission management data 18 can include header data 19 (FIG. 7). The transmission management data 18 need not, however, be data which is intended to be carried in a header. For example, the transmission management data 18 may include instruction(s) to the protocol engine 15, such as an instruction to make a time stamp, or other logic blocks in the data path which perform, for example, MACsec, IP checksum calculation and so on.

The process identifier 23 is an identifier provided in parallel to address/data information which can be used by the CPU 3 to access a peripheral. The peripheral uses the process identifier 23 to grant permission for the requested operation and identify the source.

Referring still to FIGS. 1 and 2, data 17 including transmission payload data 20, are usually stored in chains 27 in system memory 5 and are transferred to and stored in the transmit elements 16. A transmit element 16 takes the form of storage between the transfer protection circuitry 22 and the protocol engine 15. As explained earlier, a transmit element 16 is a hardware element that holds data for transmission. The transmit resource 16 may store data directly as the object to be transmitted, or indirectly as a pointer to the object in memory. A transmit element 16 can take the form of a transmit first in-first out (FIFO) buffer, a one-entry FIFO buffer or a transmit queue. The transmit element 16 or logic (not shown) associated with the transmit element can signal back-pressure 28 or other status-related information (such as resource is free, the resource is full, no credit etc.) to the transmit protection circuitry 22.

The transmit protection circuitry 22 can signal back-pressure 29 and a discard instruction 30 to the data transfer unit 11. The back-pressure 29 is used to inform the data transfer unit 11 in the form of a DMA controller not to start fetching data for a particular process identifier 23. If used, there are N back-pressure signals 29 and N discard instruction signals 30, one for each identifier, where N is a positive non-zero integer.

The communications controller 8 is configured via the SFRs 10. In particular, the SFRs 10 can be used to configure the data transfer unit 11 by providing information 31 for a look-up table 32 (FIG. 5) and to generate the transmit requests 26 (FIG. 5). Access to the SFRs 10 can be protected by the process identifier 23, for example, by limiting access to memory area in SFRs 10 by the CPU-side memory protection circuitry 4.

The communication controller 8 can handle data 17 in different ways.

The data transfer unit 11 may fetch a complete frame of data 17 and store the data 17 in the temporary buffer 13, for example, to allow filtering of the content of a frame. The protocol engine 15 retrieves the frame from the temporary buffer 13 after frame transfer have been completed. Thus, the temporary buffer 13 may have a size corresponding to the size of frame. This approach can be used in Ethernet communication. The transmit protection unit 22 analyses data on-the-fly during fetch. If the data transfer unit 11 can handle only one channel at a time, then one temporary buffer 13 is sufficient. The temporary buffer 13 may be implemented as a two-sided shadow buffer in which one side is filled by the data transfer unit 11 and the other side (previously filled) is transferred to the protocol engine 15.

In another way, the data transfer unit 11 may fetch data and store the data in temporary buffer 13. In this case, however, the protocol engine 15 may start retrieving data from the temporary buffer 13 after a receiving a first part of the frame (i.e., before the whole frame has been transferred). This approach can also be used in Ethernet communication, e.g., for jumbo frame transmission. The transmit protection unit 22 analyses data on-the-fly during fetch. In the case that a temporary buffer 13 is used, the transmit protection circuitry 22 may signal a discard 33 informing the temporary buffer 13 that the frame should not be used for transmission even in the case that a transmit element 16 has started taking data from temporary buffer 13.

In yet another way, for example in case of CAN, information from many frames may needed for proper bus arbitration (Tx-Scan). In this case, some header parts are pre-fetched and the transmit protection unit 22 analyses the pre-fetched information. In this case, the main part of frame is taken on the fly during transmission from system memory 5. In this case, the communication controller 8 may include logic (not shown) for triggering the fetching of data from the data transfer unit 11.

Figure 8:
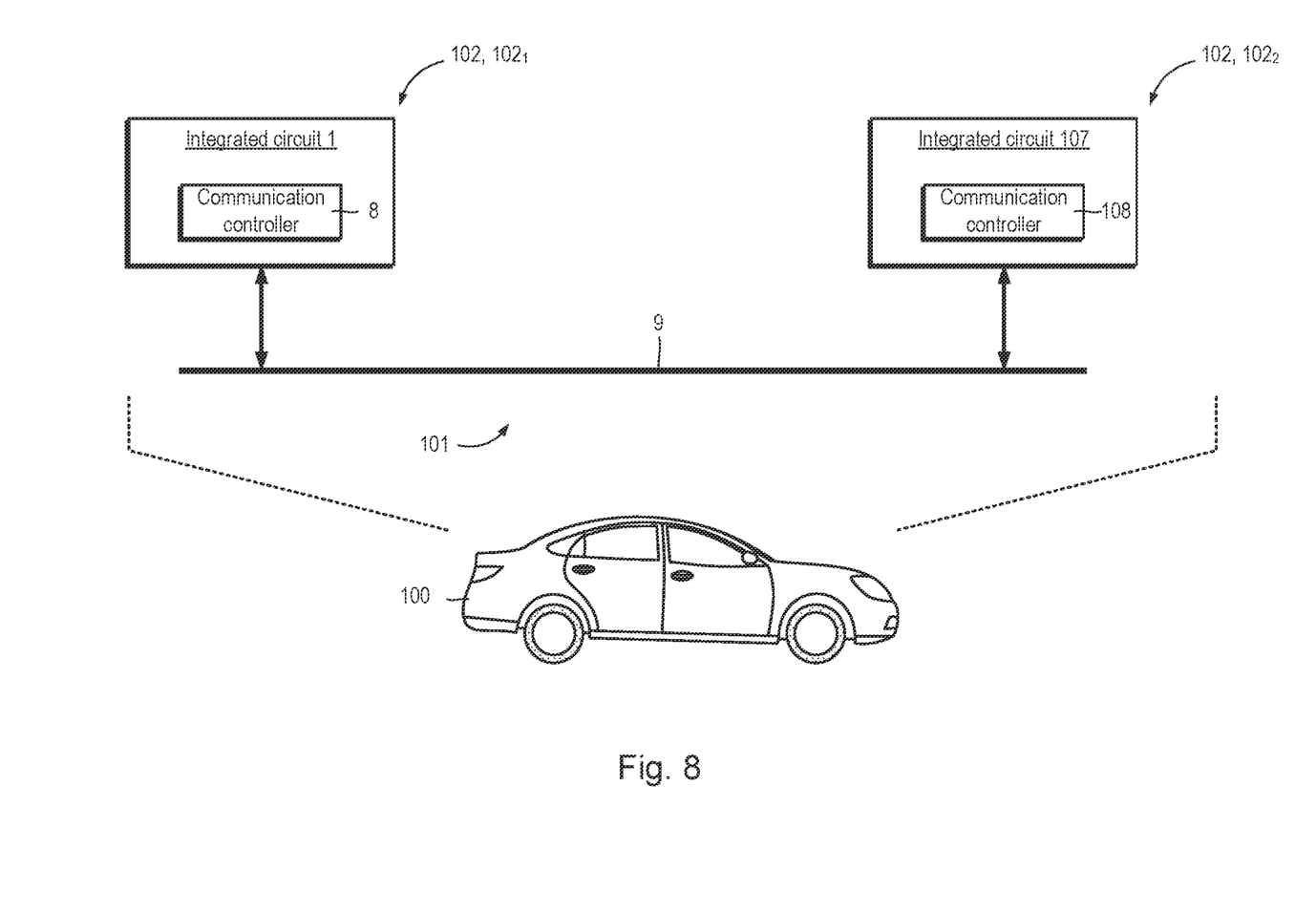
FIG. 8 is a schematic diagram illustrating a vehicle provided with a network which includes nodes, at least one of which is provided with transmit protection circuitry.

The transmit protection circuitry 22 provides a mechanism for the communication interface, i.e., communication controller 8, to allow different process entities 24 to participate in network communication without disturbing communication from other process entities 24 in the same node 102 (FIG. 8), or communication from other nodes in the same network 101 (FIG. 8).

A process entity 24 may be a piece of software or a process 21 performed by the CPU 3, such as an operating system, a virtual machine or function call, or a piece of hardware, such as a DMA controller. The transmit protection circuitry 22 augments system-level protection of memory access (for example, provided by IPMMU, content guard and other forms of memory protection) to manage resources inside integrated circuit ("communication IP") and network access.

The transmit protection circuitry 22 enhances the communication controller 8 by providing rate/event limiters (or "meters") for single transmit resources, rate/event limiters (or "meters") for plurality of transmit resources of each process, CPU, OS or the like, and/or content restrictions for each processes process, CPU, OS or the like. In relation to content restrictions, messages can be classified by (deep) package inspection (e.g., by looking at CAN ID) and/or be granted access based on filter tables, and their access can be limited or monitored by process-specific meters (for instance messages with CAN ID in a range between 80 and 100 are allowed, but only <1% bus load).

Moreover, restricting use and/or content can help improve effectiveness of use of communications controllers (such as, a CAN controller) equipped with a data transfer unit (e.g., DMAC) and can help avoid bus blocking by erratic nodes or, within a node, a process. Although other forms of network, such as Ethernet are more tolerant, transmit protection can help improve safety and security. It also reduces software effort and CPU load used for sanity checks. It can also provide a level of freedom of interference between independent processes, which is important for functional safety.

Figure 3:
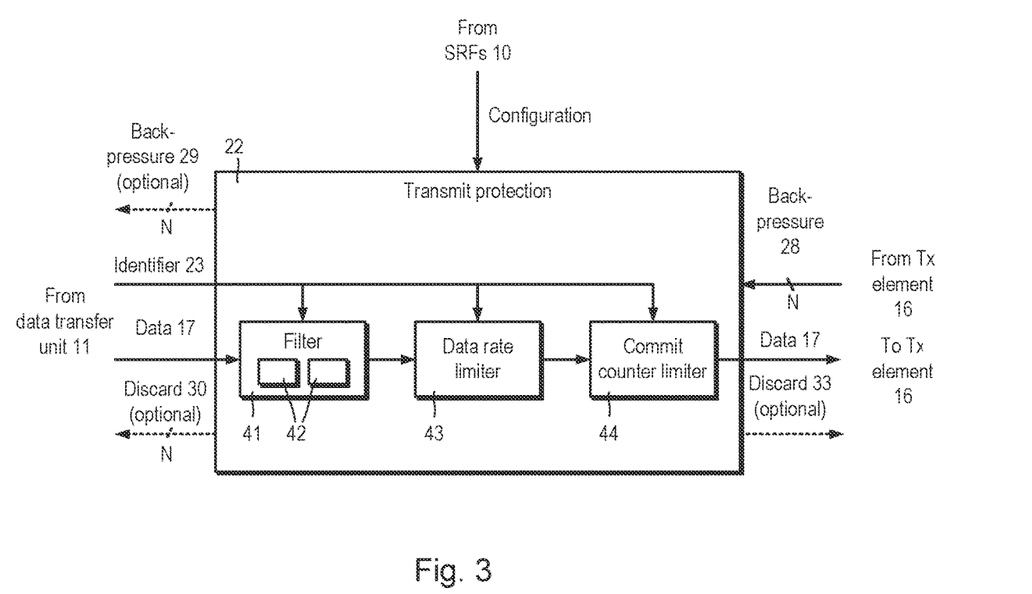
FIG. 3 is a schematic block diagram of transmit protection circuitry.
Figure 4:
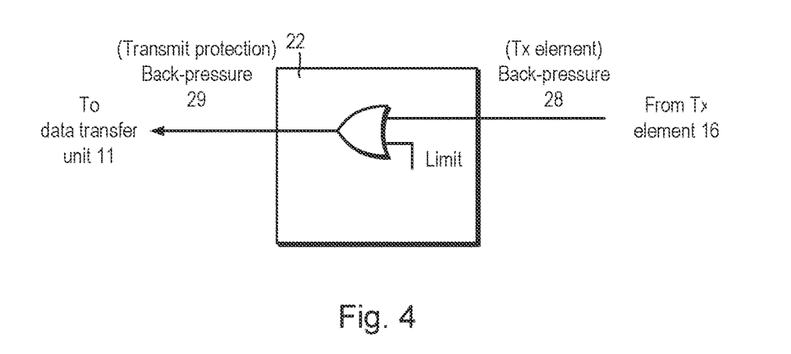
FIG. 4 is a schematic diagram illustrating a transmit protection circuitry which is able to signal back-pressure to a data transfer unit based on a back-pressure received from a transit element and a limiter or filter.

Referring also to FIG. 3, one or more forms of transmit protection may be used which uses the process identifier 23 and which may use transmission management data 18 included in the data 17.

A first form of transmit protection may prevent a process entity 24 from committing data 17 having unexpected attributes, such as, in the case of CAN, Ethernet-related attributes such as a frame ID, a source MAC address, VLAN or other transmission management data 18. Knowing the transmission attributes, an acceptance filter 41 based on the process identifier 23 is used in front of the protocol engine 15. The acceptance filter 41 may have a plurality of tables 42 (e.g., white lists and/or black lists) which are selected based on the process identifier 23. Additionally, or alternatively, ingress metering to the transmit resource 16 can be used for stream from processes.

Using an acceptance filter 41 can be used to cover situations in which a process entity or system is compromised and tries to send something on behalf of another (unauthorised) process entity 24. This approach can also be used to provide an additional level of protection for unshared transmit resources 16.

A second form of transmit protection may prevent a process entity 24 from committing too many transmit elements 16. Knowing the bandwidth requirements of processes, a commit count limiter 44 based on the process identifier 23 is used in front of the protocol engine 15. The commit count limiter 44 may be based on time-based credits, on pending transmit requests and/or on free resources. Parameters, such as credit-based shaper parameters, are provided via the SFRs 10 (FIG. 1).

Using a commit count limiter 44 can be used to cover situations in which a process entity 24 is committing too many transmit elements 16 in a defined period of time such that it introduces too many messages to a transmit queue (i.e., a transmit element) that it detrimentally affects latency for other process entities 24.

A third form of transmit protection may prevent a process entity 24 from committing transmit elements 16 for too long, i.e., committing too much data so that that the transmit element is occupied for a long period to the exclusion of other process entities. Again, knowing the bandwidth requirements of processes, a data rate limiter 43 based on the process identifier 23 is used in front of the protocol engine 15. The data rate limiter 43 may be based on time base credits, on pending transmit requests and/or on free resources, which is signalled through back-pressure 28 or other status-indicating signal.

Using a data rate limiter 43 can be used to cover situations in which a process entity 24 is committing too much payload in a defined period of time such that it causes unexpected delays or it causes the transmit resource 16 to run out of memory.

The transmit protection circuitry 22 need not include all forms of protection. Furthermore, the acceptance filter 41, the commit count limiter 44, and the data rate limiter 43 can be carried out in a different order. In this case, the acceptance filter 41 performs filtering first and then the commit count limiter 44 and/or the data rate limiter 43 performs limit-based protection thereafter. In some cases, different forms of protection can be carried out at the same time.

Figure 6:
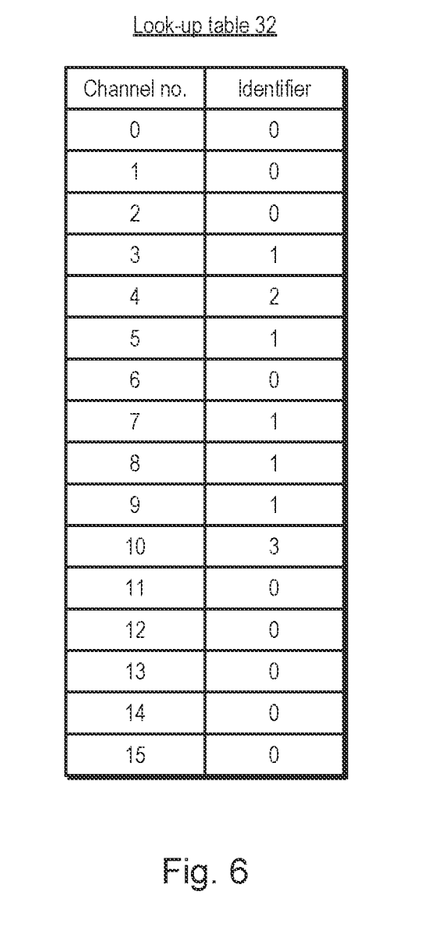
FIG. 6 is a schematic diagram illustrating an example of a look-up table used in the data transfer unit.

Referring to FIGS. 5 and 6, operation of a data transmit unit 11 in the form of a DMA controller will now be described in more detail.

The SFRs 10 issues a transmit request 26 on behalf of a process entity 24 for payload data 20 to be transmitted by the protocol engine 15.

The transmit elements 16 take the form of FIFOs which are shared by DMA channels 45. In some cases, the transmit elements 16 may have priority levels, for example, in Ethernet, a priority code point (PCP) can be used to define eight priority queues for different traffic classes. When a transmit request 26 is made to transmit one or more frames, or to empty the chain 27, the data transfer unit 11 loads the data 17 into a DMA channel 45. The DMA channel 45 is a control structure for transferring data. The DMA channel 45 may be selected based on priority level, on the availability of transmit elements 16 or using a selection mechanism, such as strict round robin, weighted round robin, or the like. The number of DMA channels 45 is greater than the number of transmit elements 16 (for example, there may be between 16 and 256 DMA channels and only 8 FIFOs) and so transmit element 16 may be filled with data 17 from more than one different DMA channels 45. Moreover, different process entities 24 may share more than one transmit element 16.

The data transfer unit 11 retrieves the data 17 from the chain 27 in system memory 5 and passes the data 17 using an identifier-based look-up table 32 to select a transmit element 16, i.e., a FIFO. The data transfer unit 11 then outputs the data 17, together with the process identifier 23, to the transmit protection circuitry 22 which performs process entity-specific shaping based on the process identifier 23.

If the process entity 24 is requesting too much data 17 to be transmitted or too frequently, or if the data 17 is incorrectly formatted, then the transmit protection circuitry 22 limits onward transmission to the shared resource 15 (i.e., the protocol engine) or discards the data 17.

The transmit protection circuitry 22 can be provided in the data transfer unit 11, between the data transfer unit 11 and the shared resource 15, or at the data transfer unit 11. The transmit protection circuitry 22 can check content before the data is added to the transmit element 16, but payload size and/or can check rates when payload is retrieved from the transmit element 16 for onward transmission to the protocol engine 15 or vice versa.

Two examples, using different communication protocols, will now be given.

A first example is an Ethernet interface (i.e., the communications controller 8 is an Ethernet port) in which eight priority queues are defined corresponding to eight PCPs in a VLAN tag (not shown). A transmit traffic shaper (such as a time-aware shaper or credit-based shaper inside the Ethernet interface are attached to these queues. In an Ethernet endpoint, the queues are typically addressed by software directly (e.g., by different DMA cannels) using descriptor chains.

Without transmit protection, a piece of software can only use its assigned DMA chain and, thus, its assigned shaper. When software writes frames with PCP=7 (high priority) to a DMA chain attached to PCP=2 (low priority), local shaping (i.e., in the transmitting endpoint) is still satisfactorily achieved according to PCP=2 (low priority). On the network side, however, the frame will use the PCP=7 (high priority) queues and so interfere with genuine high-priority traffic.

When transmit protection is used in the endpoint, a DMA chain can only initiate PCP=2 traffic and transmit protection extends over the complete network.

Conventional protection achieves a fixed relation between software process and a hardware resource, but does not check what the software is doing with the hardware resource. One solution is for the software to perform an additional check for unintended actions, such as using the incorrect PCP in example just given or (in case of virtualisation) sending data to the wrong destination MAC. This solution is, however, slow.

A second example is CAN controller.

Bus access in CAN is controlled by a CAN-ID. Based on CAN-ID, transmission of different processes inside one microcontroller and transmission of all MCUs connected to the CAN bus are arbitrated.

When a process configures an incorrect CAN ID, it can have an impact on not only communication by the local microcontroller (i.e., the microcontroller on which the process is running), but also the whole CAN bus.

Hitherto, CAN does not provide for a standardised mechanism for per stream filtering and policing to address unplanned traffic on the network which and thus there has been no mechanism to protect the CAN bus frame against, for instance, malicious frames created by software.

The transmit protection circuitry herein described can be used to provide protection via the content of the transmit buffer (or FIFO) and/or via utilization of the transmit buffer (or FIFO).

For instance, in relation to the content, the transmit protection circuitry 22 can check that the CAN-ID is valid for the resource, that the frame size for the resource is appropriate (for instance, the payload is between 0 to 120 bytes) and/or that the protocol is appropriate for the resource (i.e., CAN 2.0, CAN-FD or CAN-XL). For example, if two process entities 24 share the same transmit resource 16, the first process entity 24 may add identifiers in the range 1 to 120, and the second process entity 24 can add identifiers 100 to 1,000 (i.e., a wider range). Thus, the resource can be used for identifiers 100 to 1,000. However, the second process cannot use in the range 0 to 99. In relation to utilisation, the transmit protection circuitry 22 can check the event rate (e.g., a threshold of 1000 frames per second) and a data rate (e.g., not more than 100 kbps).

As mentioned earlier, the transmit protection circuitry 22 can control transfer of data 17 based on transmission management data 18 which describes the payload data 20 and/or is used for transmitting the payload data 20.

Referring to FIG. 7, the transmission management data 18 may include data $18_{L7\text{-}5}$, $18_{L4}$, $18_{L3}$, $18_{L2}$ generated by an application or by respective protocol engines lower in the stack 48. The payload 20 generally remains unchanged from one OSI layer to the next. In some situations, the payload may change from one OSI layer to another, e.g., when the protocol engine includes a MACsec instance. In OSI layer 1, the transmission management data 18 is header data 19 that can be encapsulated in a header 48 and a trailer is added 49. Required fields can be specified in the transmission management data 18.

For example, in the context of a layer 2 Ethernet frame, examples of management data include source information in the form of MAC source address, destination information in the form of MAC destination address, data content type in the form of EtherType, priority in the form of PCP and virtual network information in the form of VLAN ID.

In the context of CAN, particularly CAN-XL, examples of management data include payload size information in the form of data length code (DLC), destination information in the form of frame ID, data content type in the form of payload type and/or secure content indicator and virtual network information in the form of VCAN ID.

Referring to FIG. 8, a vehicle 100 is shown in which a communications network 101 is deployed which includes nodes 102, 1021, 1022 connected to a bus 9. At least a first node 1021 comprises an integrated circuit 1 as hereinbefore described which is protected by transmit protection circuitry 22. One or more of the nodes 102, 1021, 1022 may comprise an integrated circuit 107 comprising a communication controller 108 which does not have a transmit protection. For clarity, only two nodes are shown.

Modifications

It will be appreciated that various modifications may be made to the embodiments hereinbefore described. Such modifications may involve equivalent and other features which are already known in the design, manufacture and use of integrated circuits and communication controllers and component parts thereof and which may be used instead of or in addition to features already described herein. Features of one embodiment may be replaced or supplemented by features of another embodiment.

Transmit protection can be used for not only multi-CPU and hypervisor systems, but also single CPU, non-virtualised systems. For example, it might be useful to limit the amount of certain traffic that a node can generate on communication interface. For instance, in CAN, due to fault, a node may consume all of the available bandwidth, thereby stopping all other communication. Transmit protection in the form of a data rate limiter on the transmit ingress side may help to ameliorate the situation. In another example, ensuring that only expected transmit elements are committed can also benefit reserved resources.

The transmit protection circuitry can also perform DMA channel-specific operations. For example, it can limit the bandwidth for an operating system to 5 Mbps and, on top, limit the bandwidth of a channel to 1 Mbps.

The transmit protection circuitry can check the content when the data transfer unit 11 fetches frames for a transmit element. For example, the transmit protection circuitry may perform content check when the data transfer unit 11 fetches frames, but checks the rate on the protocol engine side of the transmit buffer.

The shared resource need not be a protocol engine, but can be another unit.

The transmit elements may be provided in the transmit protection unit.

The message handlers and protocol engine may be integrated into a single unit.

Although claims have been formulated in this application to particular combinations of features, it should be understood that the scope of the present disclosure also includes any novel features or any novel combination of features disclosed herein either explicitly or implicitly or any generalization thereof, whether or not it relates to the same embodiment as presently claimed in any claim and whether or not it mitigates any or all of the same technical problems as does the present disclosure. The applicants hereby give notice that new claims may be formulated to such features and/or combinations of such features during the prosecution of the present application or of any further application derived therefrom.

What is claimed is:

1. A control area network (CAN) or Ethernet communications controller comprising:
   a data transfer unit comprising a direct memory access (DMA) controller or a buffer for storing data;
   a CAN or Ethernet protocol engine configured to cause transmissions of data via a CAN or Ethernet protocol over a CAN or Ethernet network; and
   a circuit disposed between the data transfer unit and the CAN or Ethernet protocol engine configured to control whether data from the data transfer unit is transferred to the CAN or Ethernet protocol engine for transmission via the CAN or Ethernet protocol in dependence upon a process identifier which identifies a process entity requesting that the CAN or Ethernet protocol engine transmit the data over the CAN or Ethernet network and one or more of: bandwidth, transmission management data, payload content, credit, past number of or rate of requests, or available transmit resources.

2. The CAN or Ethernet communications controller of claim 1, wherein the process identifier is an operating system identifier or ContextID.

3. The CAN or Ethernet communications controller of claim 1, wherein the data transfer unit comprises the DMA controller comprising a plurality of channels, and the DMA controller is configured such that access to the channels is based on the process identifiers.

4. The CAN or Ethernet communication controller of claim 1, wherein the data transfer unit comprises the buffer for storing data.

5. The CAN or Ethernet communications controller of claim 1, wherein the protocol engine is the CAN protocol engine.

6. The CAN or Ethernet communications controller of claim 1, wherein the circuit is further configured to, in response to causing the data to not be transferred, cause the data transfer unit to discard the data.

7. The CAN or Ethernet communications controller of claim 1, wherein the circuit is further configured to signal backpressure to the data transfer unit.

8. The CAN or Ethernet communications controller of claim 7, wherein:
   the data transfer unit comprises the DMA controller; and
   the signal of backpressure is configured to cause the DMA to not fetch data for a particular process identifier.

9. The CAN or Ethernet communications controller of claim 1, further comprising:
   at least one transmit element for storing the data between the circuit and the CAN or Ethernet protocol engine, wherein the circuit is further configured to, in response to causing the data to be transferred, cause the data to be transferred to the transmit element prior to the CAN or Ethernet protocol engine.

10. An integrated circuit comprising:
    a processor; and
    the communications controller of claim 1,
    wherein the processor is configured to run the process entity requesting the CAN or Ethernet communication controller to transmit the data.

11. The integrated circuit of claim 10, further comprising:
    an on-chip interconnect configured to allow the processor to access memory and/or the CAN or Ethernet communications controller; and
    memory protection circuitry configured to control access to the on-chip interconnect connect.

12. The integrated circuit of claim 10, wherein the integrated circuit is a microcontroller or system-on-a chip.

13. A vehicle comprising:
    a bus;
    at least two nodes arranged to communicate via the bus, at least one of the at least two nodes comprising the integrated circuit of claim 10.

14. The CAN or Ethernet communications controller of claim 1, wherein the protocol engine is the Ethernet protocol engine.

15. The CAN or Ethernet communications controller of claim 1, wherein the process entity is a process running on one or more processors.

16. A method of communication control, the method comprising:
    controlling whether data is transferred from a data transfer unit comprising a direct memory access (DMA) controller or a buffer for storing data to a control area network (CAN) or Ethernet protocol engine configured to cause transmissions of data via a CAN or Ethernet protocol over a CAN or Ethernet network in dependence upon a process identifier which identifies a process entity requesting that the CAN or Ethernet protocol engine transmit the data and one or more of: bandwidth, transmission management data, payload content, credit, past number of or rate of requests, or available transmit resources.

* * * * *